United States Patent Office 3,453,266
Patented July 1, 1969

3,453,266
1,2,5-BENZOTHIADIAZEPINE 1,1-DIOXIDES
Peter H. L. Wei, Upper Darby, and Stanley C. Bell, Philadelphia, Pa., assignors to American Home Products Corporation, New York, N.Y., a corporation of Delaware
No Drawing. Filed Mar. 14, 1966, Ser. No. 533,807
Int. Cl. C07d 93/40, 41/06
U.S. Cl. 260—239.6         10 Claims

ABSTRACT OF THE DISCLOSURE

This invention is concerned with 2,3,4,5-tetrahydro-1,2, 5-benzothiadiazepine 1,1-dioxides which are pharmacologically active as depressants, anticonvulants and hypoglycemic agents. The products are prepared by condensing an orthoanilinosulfonyl chloride with an amino acetic acid to produce the sulfonamide, followed by cyclization and reduction to the final products via the intermediary lactam.

---

This invention relates to new and useful bicyclic compounds containing sulfur and nitrogen. In particular the present invention is concerned with 2,3,4,5-tetrahydro-1,2, 5-benzothiadiazepine 1,1-dioxides having pharmacological activity.

The novel compounds which are included within the scope of this invention are represented by the following formula:

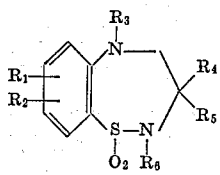

wherein $R_1$ and $R_2$ are selected from the group consisting of hydrogen, lower alkyl, halogen and sulfamoyl; $R_3$ is selected from the group consisting of hydrogen, lower alkyl, and lower alkylcarbonyl; $R_4$ and $R_5$ when taken separately are both selected from the group consisting of hydrogen, aryl, e.g., phenyl, and lower alkyl with the proviso that one of $R_4$ and $R_5$ be hydrogen, when $R_4$ and $R_5$ are concatenated they form a ring selected from the group consisting of spiropentamethylene, spirohexamethylene and spiroheptamethylene, and $R_6$ is selected from the group consisting of hydrogen and lower alkyl. Examples of such compounds include: 7-chloro-2,3,4,5-tetrahydro-8-methyl-1,2,5-benzothiadiazepine 1,1-dioxide; 8-chloro-2,3, 4,5-tetrahydro-7-methyl-1,2,5-benzothiadiazepine 1,1 - dioxide; 7-chloro-2,3,4,5-tetrahydro-2,5,8-trimethyl - 1,2,5-benzothiadiazepine 1,1-dioxide and 5-acetyl-7-chloro-2,3,4, 5-tetrahydro-1,2,5-benzothiadiazepine 1,1-dioxide.

A process for syntesizing the compounds of the present invention is hereinafter described so as to enable a person skilled in the art of chemistry to prepare the same. This process is schematically illustrated as follows:

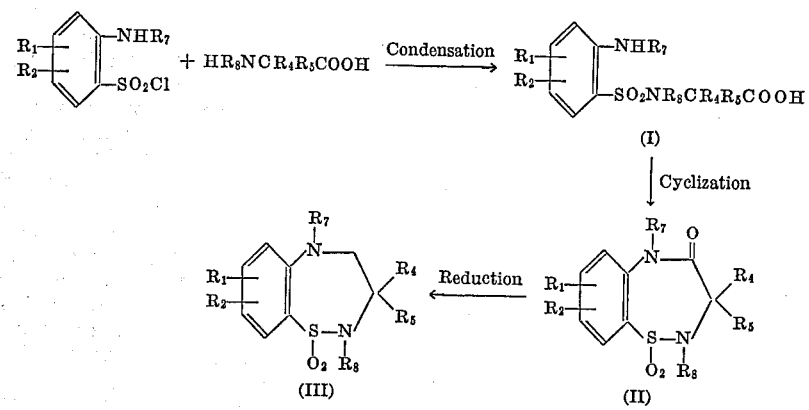

wherein $R_1$, $R_2$, $R_4$ and $R_5$ are defined as above, and $R_7$ and $R_8$ are either hydrogen or lower alkyl. The reaction between the 2-aminobenzenesulfonyl chloride and the 2-aminocarboxylic acid is conducted in an alkaline aqueous solution (e.g., alkali metal hydroxide) and a water insoluble reaction-inert organic solvent at a temperature range of from about 25° C. to about 100° C. for a period of about one to six hours. Thereafter, the reaction mixture is cooled, extracted with a water immiscible organic solvent, and acidified with a mineral acid. The resulting precipitated N-(2-aminobenzenesulfonyl) aminoacid (I) is then separated by conventional means, such as, filtration and recrystallization from a suitable solvent, e.g., an alkanol.

The above prepared N - (2 - aminobenzenesulfonyl) aminoacid (I) is reacted with a chloronating agent e.g. phosphorous pentachloride, phosphorous trichloride or thionyl chloride, in a reaction-inert organic solvent at a temperature range of from 25° C. to about 50° C. for a period of about five to ten hours. Subsequently, the resulting solid 2,3-dihydro-1,2,5-benzothiadiazepinone 1,1-dioxide (II) is separated from the reaction mixture by conventional means, e.g., washing, drying and recrystallization.

Reduction of the carbonyl group in 2,3-dihydro-1,2,5-benzothiadiazepinone 1,1-dioxide (II) may be effected by reaction with a reducing agent, such as lithium aluminum hydride. When the reduction is complete the resulting 2,3,4,5 - tetrahydro - 1,2,5-benzothiadiazepine 1,1-dioxide may be separated by conventional recovery procedures.

An alternate procedure for the preparation of the compounds of this invention is described in the following schematic sequence of reactions:

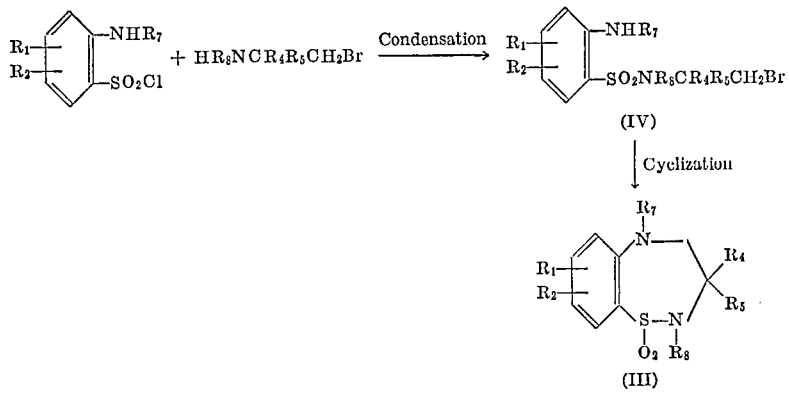

wherein $R_1$, $R_2$, $R_4$, $R_5$, $R_7$ and $R_8$ are defined as above. The reaction between the 2-aminobenzenesulfonyl chloride and the 2-bromoethylamine is conducted in an aqueous mixture consisting of water and a water miscible, organic solvent (e.g., water-dioxane), in the presence of triethylamine, at a temperature from about 0° C. to about 40° C. for a period of about one to about five hours. When the reaction is complete, the 2-amino-N-(2-bromoethyl)-benzenesulfonamide (IV) is separated by standard recovery procedures, for example, concentration, extraction, evaporation and crystallization.

The above prepared 2-amino-N-(2-bromoethyl)benzenesulfonamide (IV) is cyclized by prolonged heating thereof at elevated temperatures in an ethanolic solution. Thereafter, the resulting 2,3,4,5-tetrahydro-1,2,5-benzothiadiazepine 1,1-dioxide (III) is recovered by conventional means and recrystallized from an alkanol.

It should be noted that the 5-acrylated 2,3,4,5-tetrahydro-1,2,5-benzothiadiazepine 1,1-dioxide of this invention can be made by the acylation of one of the above prepared 5-unsubstituted 2,3,4,5-tetrahydro-1,2,5-benzothiadiazepine 1,1-dioxides by procedures well known to those skilled in the chemical art. Such procedures are described in "Organic Chemistry" by Fieser and Fieser, third edition, at p. 253.

Many of the reactants employed in the above described processes are known compounds which are readily available from commercial sources. Others which are not commercially available can easily be prepared in accordance with standard organic procedures well known to those skilled in the art.

In accord with the present invention, the new 2,3,4,5-tetrahydro-1,2,5-benzothiadiazepine 1,1-dioxides herein described have been found to possess interesting pharmaceutical properties which render them useful as synthetic medicinals. More particularly, these compounds, in standard pharmacological tests, have exhibited utility as depressants, anticonvulsant, and hypoglycemic agents.

When the compounds of this invention are employed as depressant, anticonvulsant and hypoglycemic agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirable administered at a concentration level that will generally afford effective results without causing any harmful or deleterious side effects and preferably at a level that is in the range of from about 10 mg. to about 400 mg. per day, although as aforementioned variations will occur. However, a dosage level that is in the range of from about 25 mg. to about 200 mg. per day is most desirably employed in order to achieve effective results.

The following examples are given by way of illustration and are not to be construed as limitations of this invention, many variations of which are possible without departing from the scope and spirit thereof.

EXAMPLE I 2-amino-4-chloro-5-methylbenzenesulfonyl chloride (36 g., 0.15 m.) is added to 70 ml. of a saturated sodium bicarbonate solution containing 22.5 g. (0.30 m.) of glycine. To the above solution 110 ml. of a 10% sodium hydroxide solution is added in 30 minutes. Enough dioxane is added to give a homogeneous solution, this solution is stirred at room temperature for one hour and then heated on a steam bath for three hours. The alkaline mixture is cooled, extracted with benzene, acidified with hydrochloric acid, the solids collected, washed with water and dried. The crude material is recrystallized from ethanol to yield N-(2-amino-4-chloro-5-methylbenzenesulfonyl)glycine, M.P. 198–200° C.

*Analysis.*—Calcd. for $C_9H_{11}ClN_2O_4S$: C, 38.7; H, 3.98; Cl, 12.72; N, 10.05; S, 11.5. Found: C, 38.94; H, 4.00; Cl, 12.7; N, 10.21; S, 10.93.

The above prepared N-(2-amino-4-chloro-5-methylbenzenesulfonyl)-glycine (10 g., 0.3 m.) is suspended in 400 ml. of carbon tetrachloride and phosphorous pentachloride (5 g.) is added. The mixture is then stirred at room temperature for five hours. Thereafter, the gelatinous solids are collected, washed with carbon tetrachloride, then with petroleum ether, and dried in a desiccator. The crude material (12.5 g.) is recrystallized by dissolution in dioxane and subsequent precipitation with ether to yield 7 - chloro - 2,3 - dihydro - 8 - methyl - 1,2,5 - benzothiadiazepin-4 (5H)-one 1,1-dioxide, M.P. 235–240° C.

*Analysis.*—Calcd. for C$_9$H$_9$ClN$_2$O$_3$S: C, 41.3; H, 3.47; Cl, 13,62; N, 10.73; S, 12.3. Found: C, 41.68; H, 3.47; Cl, 13.60; N, 10.33; S, 11.6.

This 7 - chloro-2,3-dihydro-8-methyl-1,2,5-benzothiadiazepin-4-(5H)-one 1,1-dioxide (1.0 g., 0.00385 m.) is dissolved in dimethoxyethane and the solution added to a suspension of 0.2 g. of lithium aluminum hydride in the same solvent. The mixture is refluxed for two hours, cooled and neutralized with hydrochloric acid. The inorganic salts are removed, the organic solution dried over anhydrous magnesium sulfate, the solvent removed at reduced pressure and the residue recrystallized with ethanol to yield 7-chloro-2,3,4,5-tetrahydro-8-methyl-1,2,5-benzothiadiazepine 1,1-dioxide, M.P. 199–200° C.

*Analysis.*—Calcd. for C$_9$H$_{11}$ClN$_2$O$_2$S: C, 43.70; H, 4.49; Cl, 14.37; N, 11.33; S, 13.00. Found: C, 43.86; H, 4.24; Cl, 14.40; N, 11.57; S, 12.50.

In a similar manner, 7,8-dichloro-2,3,4,5-tetrahydro-8-methyl-1,2,5-benzothiadiazepine 1,1-dioxide and 6-bromo-2,3,4,5-tetrahydro-1,2,5-benzothiadiazepine 1,1-dioxide are obtained.

EXAMPLE II

To an aqueous dioxane solution of 12 g. (0.05 m.) of 2-amino-5-chloro-4-methylbenzenesulfonyl chloride and 10.2 g. (0.05 m.) of 2-bromoethylamine hydrobromide, there is slowly added 10 g. (0.1 m.) of triethylamine. Thereafter, the mixture is stirred for 15 minutes and extracted with benzene. The benzene extracts are dried over anhydrous magnesium sulfate, the drying agent removed, and the benzene evaporated. The residue is dissolved in ethanol, heated on a steam bath for several hours, the solids collected by filtration and recrystallized from ethanol to yield 8-chloro-2,3,4,5-tetrahydro-7-methyl-1,2,5-benzothiadiazepine 1,1-dioxide, M.P. 236–238° C.

*Analysis.*—Calcd. for C$_9$H$_{11}$ClN$_2$O$_2$S: C, 43.70; H, 4.49; Cl. 14.37; N, 11.33; S, 13.00. Found: C, 43.69; H, 4.40; Cl, 14.40; N, 10.97; S, 13.00.

EXAMPLE III

To a mixture of 10 g. (0.416 m.) of 2-amino-4-chloro-5-methylbenzenesulfonylchloride and 8.53 g. (0.0416 m.) of 2-bromoethylamine hydrobromide in aqueous dioxane two equivalents of triethylamine are gradually added and the resulting solution is stirred at 0° C. for three hours. The mixture is concentrated at reduced pressure, the residue diluted with water, extracted with benzene and the benzene extracts dried over anhydrous magnesium sulfate. After the drying agent is removed, the solvent is evaporated. The residue is first washed with some hot cyclohexane and then recrystallized from ethanol to yield 6-amino - N - (2 - bromoethyl) - 4 - chloro - m - toluenesulfonamide, M.P. 89–90° C.

*Analysis.*—Calcd. for C$_9$H$_{12}$BrClN$_2$O$_2$S: C, 32.96; H, 3.69; Br, 24.44; Cl. 10.83; N, 8.53; S, 9.78. Found: C, 33.23; H, 3.71; Br, 24.80; Cl, 10.95; N, 8.78; S, 9.95.

The above prepared 6-amino-N-(2-bromoethyl)-4-chloro-m-toluenesulfonamide is heated in ethyl alcohol to yield 7-chloro-2,3,4,5-tetrahydro-8-methyl-1,2,5-benzothiadiazepine 1,1-dioxide, M.P. 199–200° C.

*Analysis.*—Calcd. for C$_9$H$_{11}$ClN$_2$O$_2$S: C, 43.70; H, 4.49; Cl, 14.37; N, 11.33; S, 13.00. Found: C, 43.86; H, 4.24; Cl. 14.40; N, 11.57; S, 12.50.

Similarly, the following compounds are produced:

2,3,4,5-tetrahydro-1,2,5-benzothiadiazepine 1-1-dioxide;

7 - ethyl - 2,3,4,5 - tetrahydro - 1,2,5-benzothiadiazepine 1,1-dioxide; and 7,9 - dibromo - 2,3,4,5 - tertahydro - 1,2,5 - benzothiadiazepine 1,1-dioxide.

EXAMPLE IV

2 - amino - 4 - chloro - 5 - methylbenzenesufonyl chloride (0.30 m.) is added to 140 ml. of saturated sodium bicarbonate solution containing (0.60 m.) of α-phenyl glycine. To the resulting solution there is added 110 ml. of a 20% sodium hydroxide solution. The solution is stirred at room temperature for two hours and then heated on a steam bath for four hours. Subsequently, the alkaline mixture is cooled, extracted with benzene, acidified with hydrochloric acid, the solids collected, washed with water and dried. The crude material is recrystallized from ethanol to yield N-(2-amino-4-chloro-5-methylbenzenesulfonyl)-phenylglycine.

The N - (2-amino-4-chloro-5-methylbenzenesulfonyl)-phenylglycine prepared above (0.6 m.) is suspended in 800 ml. of carbon tetrachloride. Phosphorous pentachloride (10 g.) is added and the mixture stirred at room temperature for eight hours. The resulting solids are collected, first washed with carbon tetrachloride and then with petroleum ether. The remaining material is dried and then recrystallized by dissolution in dioxane and precipitation with ether to yield 7-chloro-2,3-dihydro-8-methyl - 3 - phenyl - 1,2,5 - benzothiadiazepin - 4 - (5H)-one 1,1-dioxide.

7 - chloro - 2,3 - dihydro - 8 - methyl - 3 - phenyl - 1,2,5-benzothiadiazepin-4-(5H)-one 1,1-dioxide (2.0 g.) is dissolved in dimethoxy ethane and the solution added to a suspension of 0.4 g. of lithium aluminum hydride in the same solvent. The mixture is refluxed for 3 hours, cooled and neutralized with hydrochloric acid. The inorganic salts are removed, the organic solution dried over anhydrous magnesium sulfate, the solvent removed at reduced pressure and the residue recrystallized with ethanol to yield 7-chloro-2,3,4,5-tetrahydro-8-methyl-3-phenyl-1,2,5-benzothiadiazepine 1,1-dioxide.

Utilizing the above procedure, 2-amino-4-chloro-5-methylbenzenesulfonyl chloride is reacted with alanine to produce N-(2-amino-4-chloro-5-methylbenzenesulfonyl)-alanine. Upon cyclization of this substituted alanine, there is obtained 7-chloro-2,3-dihydro-3,8-dimethyl-1,2,5-benzothiadiazepin-4-(5H)-one 1,1-dioxide which is then reduced to yield 7-chloro-2,3,4,5-tetrahydro-3,8-dimethyl-1,2,5-benzothiadiazepine 1,1-dioxide.

EXAMPLE V

2 - amino - 4 - chloro - 5 - methylbenzenesulfonyl chloride (0.15 m.) is added to 70 ml. of a saturated sodium bicarbonate solution containing 1-aminocyclohexane carboxylic acid (0.30 m.). To the above solution 110 ml. of a 10% sodium hydroxide solution is added in one hour. Enough dioxane is added to give a homogeneous solution, the solution is stirred at room temperature for one hour and then heated on a steam bath for three hours. The alkaline mixture is cooled, extracted with benzene, acidified with hydrochloric acid, the solids collected, washed with water and dried. The crude material is recrystallized from ethanol to yield N-(2-amino-4-chloro-5-methylbenzesulfonyl) - 1 - aminocyclohexane carboxylic acid.

N - (2 - amino - 4 - chloro - 5 - methylbenzenesulfonyl)-1-aminocyclohexane carboxylic acid (0.3 m.) is suspended in 400 ml. of carbon tetrachloride and phosporous pentachloride (5 g.) added. The mixture is stirred at room temperature for five hours. The solids are collected, washed with carbon tetrachloride and then with petroleum ether. The crude product, after drying in a desiccator is recrystallized by first dissolving in dioxane and then precipitating with ether to obtain 7-chloro-2,3-dihydro - 8 - methyl - 3,3 - spiro - pentamethylene - 1,2,5-benzothiadiazepin-4-(5H)-one 1,1-dioxide.

The above prepared 7-chloro-2,3-dihydro-8-methyl-3,3 - spiropentamethylene - 1,2,5 - benzothiadiazepin - 4-(5H)-one 1,1-dioxide is dissolved in dimethoxyethane and the solution added to a suspension of 0.2 g. of lithium aluminum hydride in the same solvent. The mixture is refluxed for two hours, cooled and neutralized with hydrochloric acid. The inorganic salts are removed and the organic solution dried over anhydrous magnesium sulfate. The solvent is then removed at reduced pressure, the residue is recrystallized with methanol to yield 7-chloro - 2,3,4,5 - tetrahydro - 8 - methyl - 3,3 - spiropentamethylene-1,2,5-benzothiadiazepine 1,1-dioxide.

In a similar manner, 8-ethyl-2,3,4,5-tetrahydro-7-iodo-3,3-spirohexamethylene-1,2,5-benzothiadiazepine 1,1-dioxide and 2,3,4,5-tetrahydro-3,3-spiroheptamethylene-7-propyl-1,2,5-benzothiadiazepine 1,1-dioxide are produced.

EXAMPLE VI

To a mixture of (0.40 m.) of 4-chloro-6-methylamino-m-toluene sulfonylchloride and (0.40 m.) of N-methyl-2-bromoethylamine in aqueous dioxane two equivalents of triethylamine are gradually added. The solution is stirred in an ice bath for four hours and then concentrated at reduced pressure. The residue is diluted with water, extracted with benzene, and the benzene extracts dried over anhydrous magnesium sulfate. After removing the drying agent, the solvent is evaporated and the residue washed with hot cyclohexane and recrystallized from ethanol to yield N-(2-bromoethyl)-N-methyl-4-chloro-6-methylamino-m-toluene sulfonamide. The above prepared compound is dissolved in ethanol and heated to 75° C. for four hours. Thereafter, the crude product is recrystallized from ethanol to yield 7-chloro-2,3,4,5-tetrahydro - 2,5,8 - trimethyl-1,2,5-benzothiadiazepine 1,1-dioxide.

Similarly, 7-chloro - 2,3,4,5-tetrahydro-2,5 - dimethyl-1,2,5-benzothiadiazepine 1,1-dioxide is produced.

EXAMPLE VII 7-chloro - 2,3-dihydro-8-sulfamoyl - 1,2,5-benzothiadiazepin-4-(5H)-one 1,1-dioxide (1.0 g.) is dissolved in tetrahydrofuran and the solution added to a tetrahydrofuran suspension of lithium aluminum hydride (0.2 g.). The mixture is refluxed for three hours, cooled and neutralized with hydrochloric acid. The inorganic salts are removed, the organic solution dried over anhydrous magnesium sulfate, the solvent evaporated and the residue recrystallized from methanol to obtain 7-chloro-2,3,4,5-tetrahydro-8-sulfamoyl - 1,2,5-benzothiadiazepine 1,1-dioxide.

In a similar manner, 3-ethyl-2,3,4,5-tetrahydro-1,2,5-benzothiadiazepine 1,1-dioxide is obtained.

EXAMPLE VIII 7-chloro - 2,3,4,5-tetrahydro - 8-methyl - 1,2,5-benzothiadiazepine, 1,1-dioxide (0.20 m.) as prepared in Example I is dissolved in a 10% sodium hydroxide solution and admixed with dimethyl sulfate (0.50 m.). The resulting precipitate is recrystallized from dimethoxyethane to yield 7-chloro-2,3,4,5-tetrahydro - 2,5,8-trimethyl-1,2,5-benzothiadiazepine 1,1-doxide.

In a similar manner, 8-chloro-2,5,7 - triethyl-2,3,4,5-tetrahydro-1,2,5 - benzothiadiazepine 1,1-dioxide is prepared.

EXAMPLE IX 7-chloro-2,3,4,5-tetrahydro-8 - methyl - 1,2,5-benzothiadiazepine 1,1-dioxide (0.10 m.) dissolved in 150 ml. of chloroform, in the presence of triethylamine (0.01 m.) is admixed with acetyl chloride (0.30 m.) for one hour at 30° C. Thereafter, the solvent is evaporated and the residue recrystallized from ethanol to yield 5-acetyl-7-chloro - 2,3,4,5 - tetrahydro - 8-methyl - 1,2,5-benzothiadiazepine 1,1-dioxide.

Similarly, 2,3,4,5 - tetrahydro - 5 - propionyl - 1,2,5-benzothiadiazepine 1,1-dioxide is obtained.

What is claimed is:
1. A compound selected from the group consisting of those having the formula:

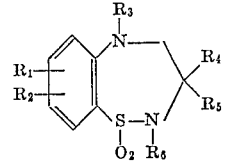

wherein $R_1$ and $R_2$ are selected from the group consisting of hydrogen, lower alkyl, halogen and sulfamoyl; $R_3$ is selected from the group consisting of hydrogen, lower alkyl, and lower alkylcarbonyl; $R_4$ and $R_5$ when taken separately are both selected from the group consisting of hydrogen, phenyl and lower alkyl with the proviso that one of $R_4$ and $R_5$ be hydrogen and when $R_4$ and $R_5$ are concatenated they form a ring selected from the group consisting of spiropentamethylene, spirohexamethylene and spiroheptamethylene; and $R_6$ is selected from the group consisting of hydrogen and lower alkyl.

2. 7-chloro - 2,3,4,5 - tetrahydro - 8-methyl - 1,2,5-benzothiadiazepine 1,1-dioxide.
3. 8 - chloro - 2,3,4,5-tetrahydro - 7 - methyl-1,2,5-benzothiadiazepine 1,1-dioxide.
4. 7-chloro - 2,3,4,5 - tetrahydro - 3,8 - dimethyl-1,2,5-benzothiadiazepine 1,1-dioxide.
5. 7-chloro - 2,3,4,5 - tetrahydro - 8-methyl-3-phenyl-1,2,5-benzothiadiazepine 1,1-dioxide.
6. 7 - chloro - 2,3,4,5 - tetrahydro - 8 - methyl-3,3-spiropentamethylene - 1,2,5 - benzothiadiazepine 1,1 - dioxide.
7. 7 - chloro - 2,3,4,5 - tetrahydro - 8 - sulfamoyl-1,2,5-benzothiadiazepine 1,1-dioxide.
8. 7 - chloro - 2,3,4,5 - tetrahydro - 2,5,8 - trimethyl-1,2,5-benzothiadiazepine 1,1-dioxide.
9. 5 - acetyl - 7-chloro - 2,3,4,5 - tetrahydro - 1,2,5-benzothiadiazepine 1,1-dioxide.
10. 8 - chloro - 2,5,7 - triethyl - 2,3,4,5 - tetrahydro-1,2,5-benzothiadiazepine 1,1-dioxide.

References Cited

Whitehead et al.: Chemical Abstracts, vol. 58 (1963), pages 9080.

JAMES A. PATTEN, *Primary Examiner.*

U.S. Cl. X.R.

260—327, 2393; 424—999